No. 817,450. PATENTED APR. 10, 1906.
D. W. SHIEK.
COMPUTING MACHINE.
APPLICATION FILED SEPT. 1, 1904.

6 SHEETS—SHEET 1.

No. 817,450. PATENTED APR. 10, 1906.
D. W. SHIEK.
COMPUTING MACHINE.
APPLICATION FILED SEPT. 1, 1904.

6 SHEETS—SHEET 2.

Witnesses:
Robert H. Weir
J. B. Weir

Inventor:
Daniel W. Shiek
By John W. Hill
Atty.

No. 817,450. PATENTED APR. 10, 1906.
D. W. SHIEK.
COMPUTING MACHINE.
APPLICATION FILED SEPT. 1, 1904.

No. 817,450. PATENTED APR. 10, 1906.
D. W. SHIEK.
COMPUTING MACHINE.
APPLICATION FILED SEPT. 1, 1904.
6 SHEETS—SHEET 5.
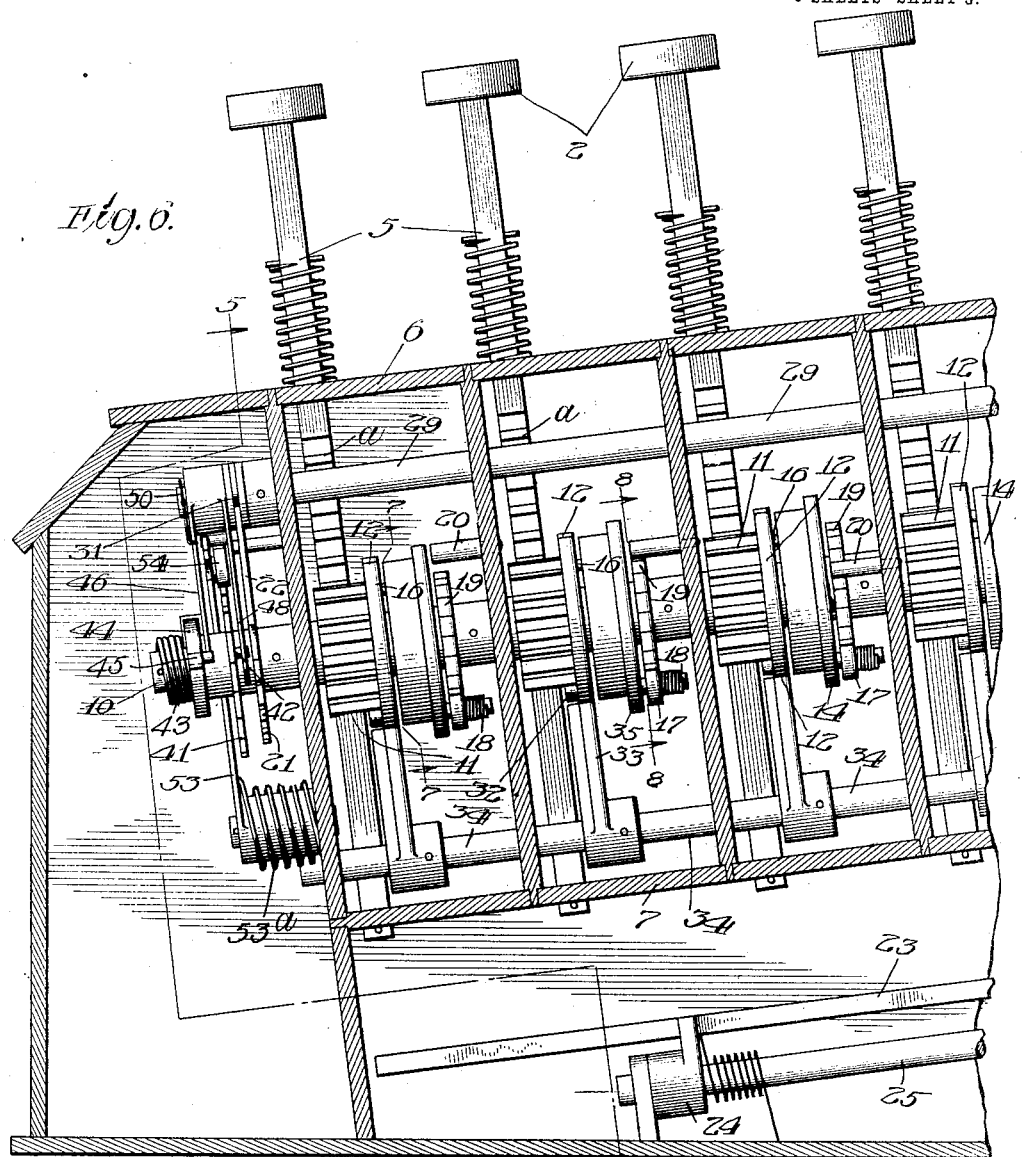
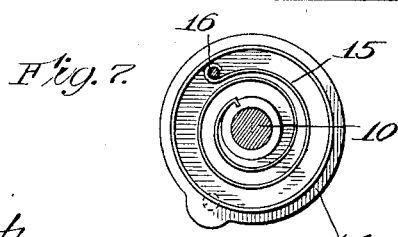
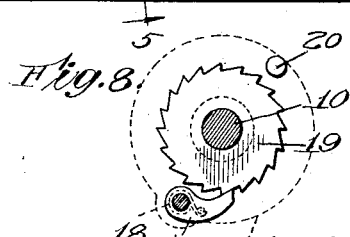
Witnesses:
Robert H. Weir
J. B. Weir
Inventor:
Daniel W. Shiek
By John W. Hill
Atty.

No. 817,450. PATENTED APR. 10, 1906.
D. W. SHIEK.
COMPUTING MACHINE.
APPLICATION FILED SEPT. 1, 1904.
6 SHEETS—SHEET 6.
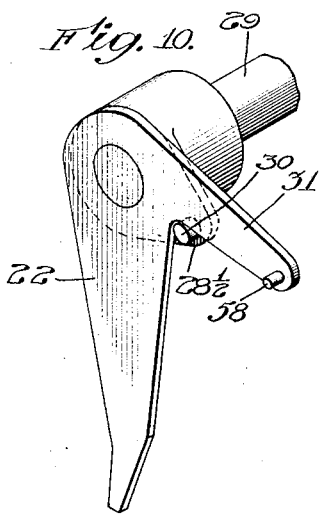
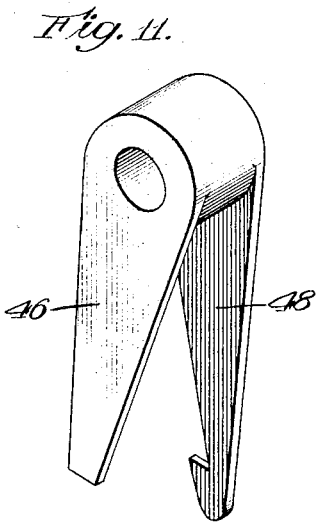
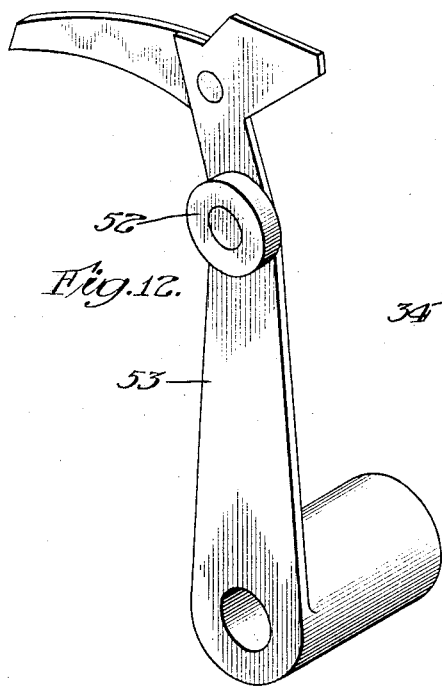
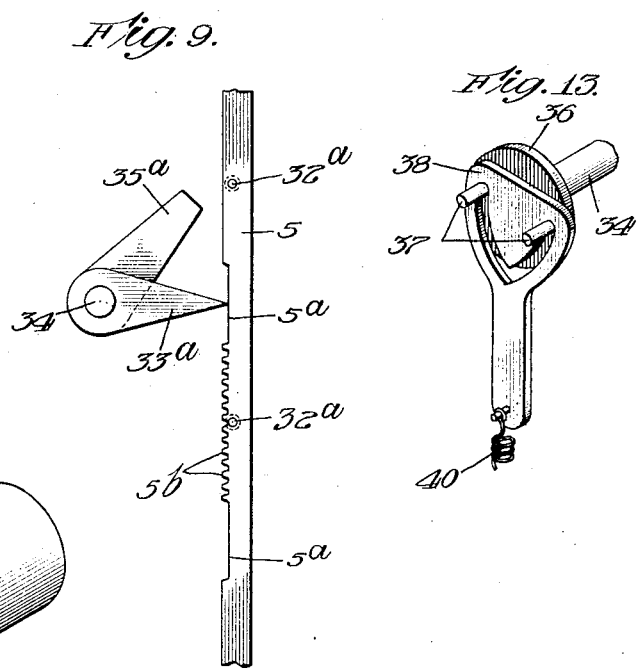
Witnesses:
Robert H. Weir
J. B. Weir
Inventor:
Daniel W. Shiek
By John W. Hill
Atty.

UNITED STATES PATENT OFFICE.

DANIEL W. SHIEK, OF CHICAGO, ILLINOIS, ASSIGNOR OF ONE-HALF TO WALTER L. MILLIKEN, OF INDIANAPOLIS, INDIANA.

COMPUTING-MACHINE.

No. 817,450.      Specification of Letters Patent.      Patented April 10, 1906.

Application filed September 1, 1904. Serial No. 223,014.

*To all whom it may concern:*

Be it known that I, DANIEL W. SHIEK, a citizen of the United States of America, residing at Chicago, in the county of Cook and State of Illinois, have invented certain new and useful Improvements in Computing-Machines, of which the following is a description.

My invention relates to that class of devices adapted to work mathematical computations by mechanical means operated by the manipulation of a series of keys or levers.

The object of my invention is to produce a device of the kind described which is easily operated at any speed, is simple and convenient in arrangement, and is so constructed that when any key is depressed less than its full stroke it will be automatically locked in its depressed position and all other keys of the series will be prevented from operating until the partially-depressed key is fully depressed to complete its stroke.

With this object in view my invention consists in the novel construction, arrangement, and combination of parts herein shown and described, and more particularly pointed out in the claims.

Figure 1:
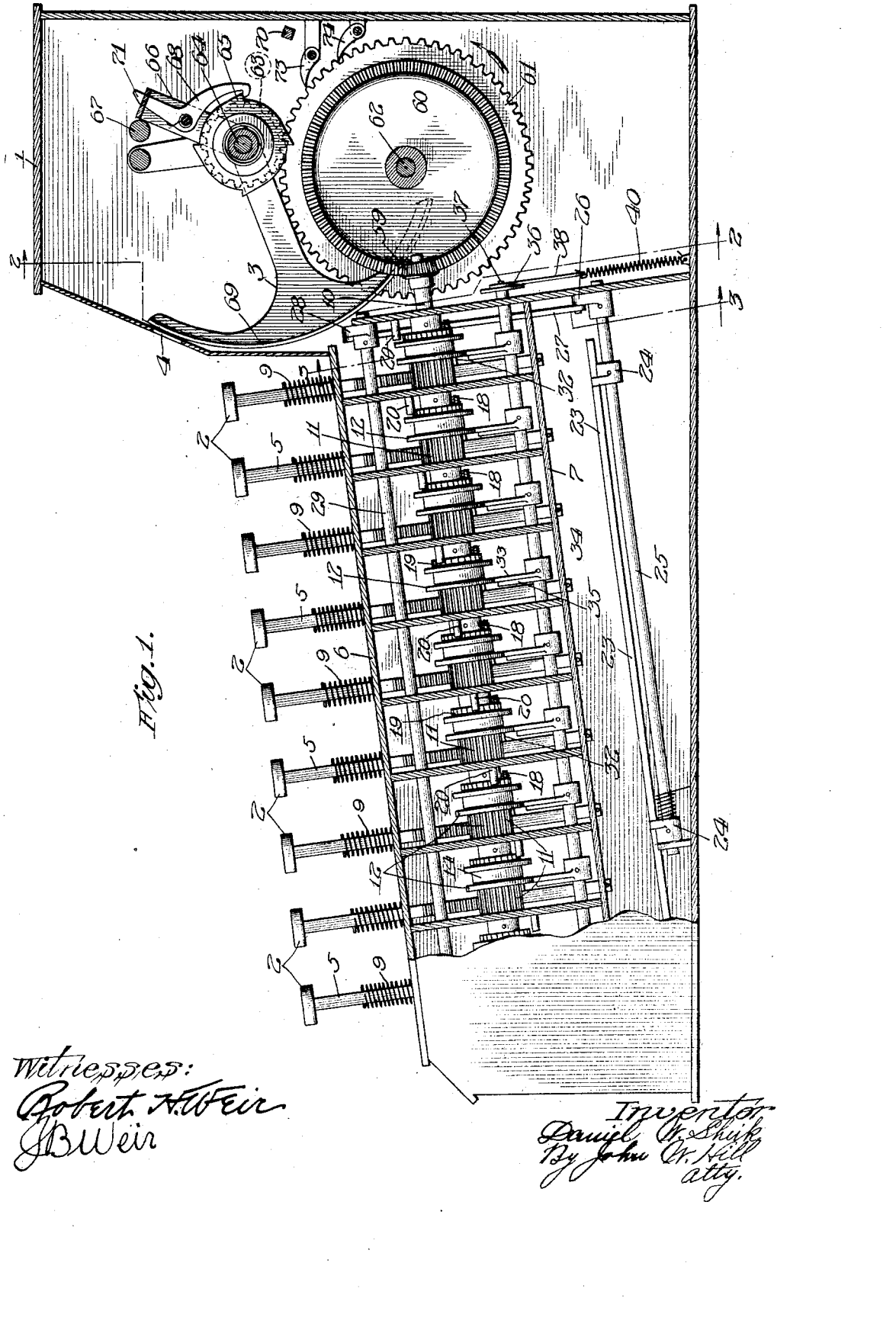
Figure 2:
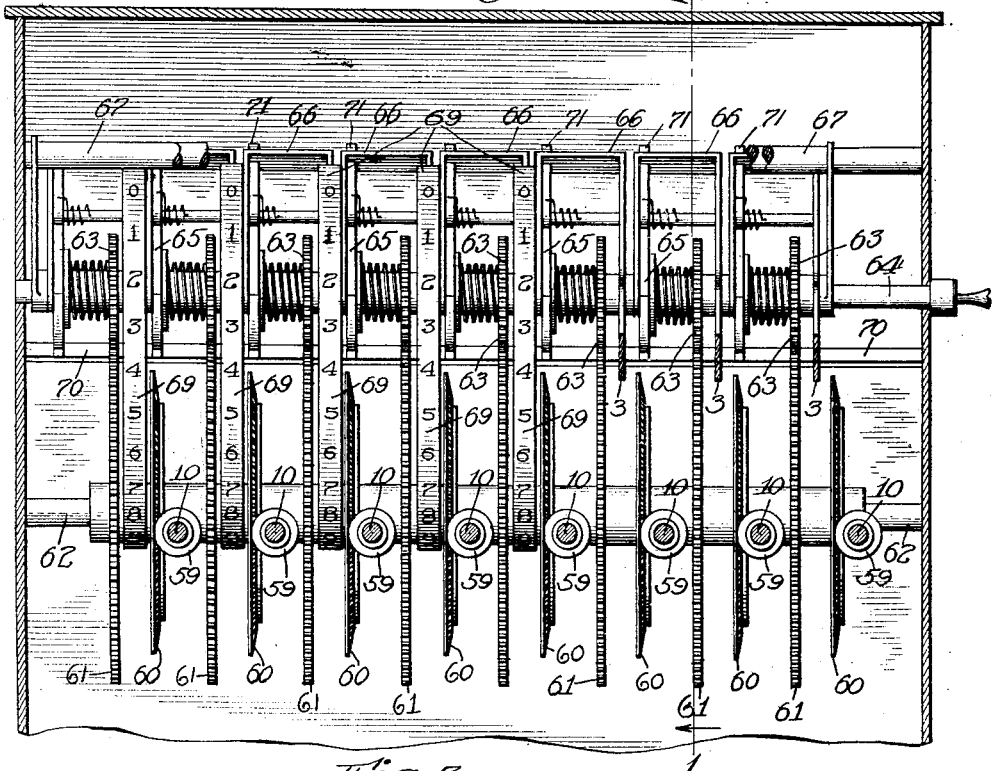
Figure 3:
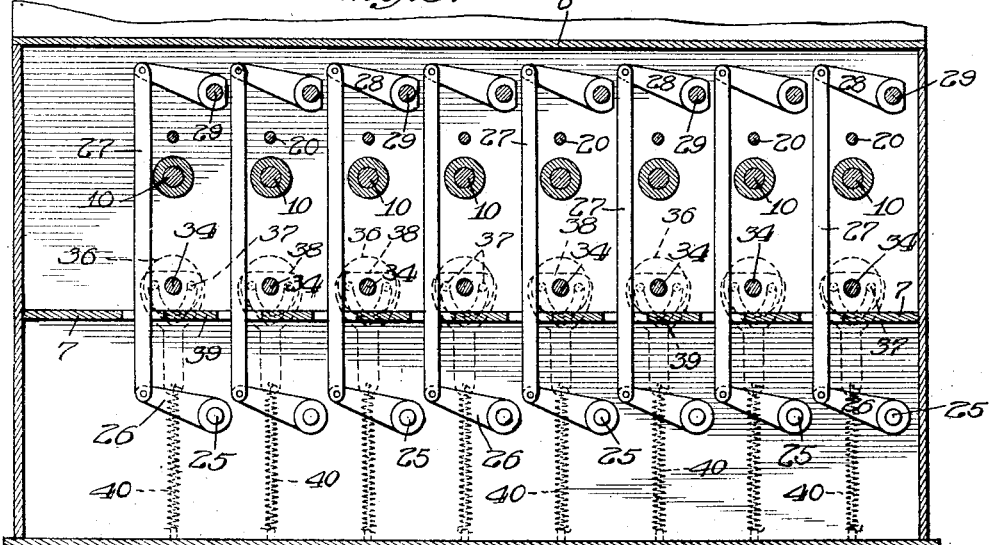
Figure 4:
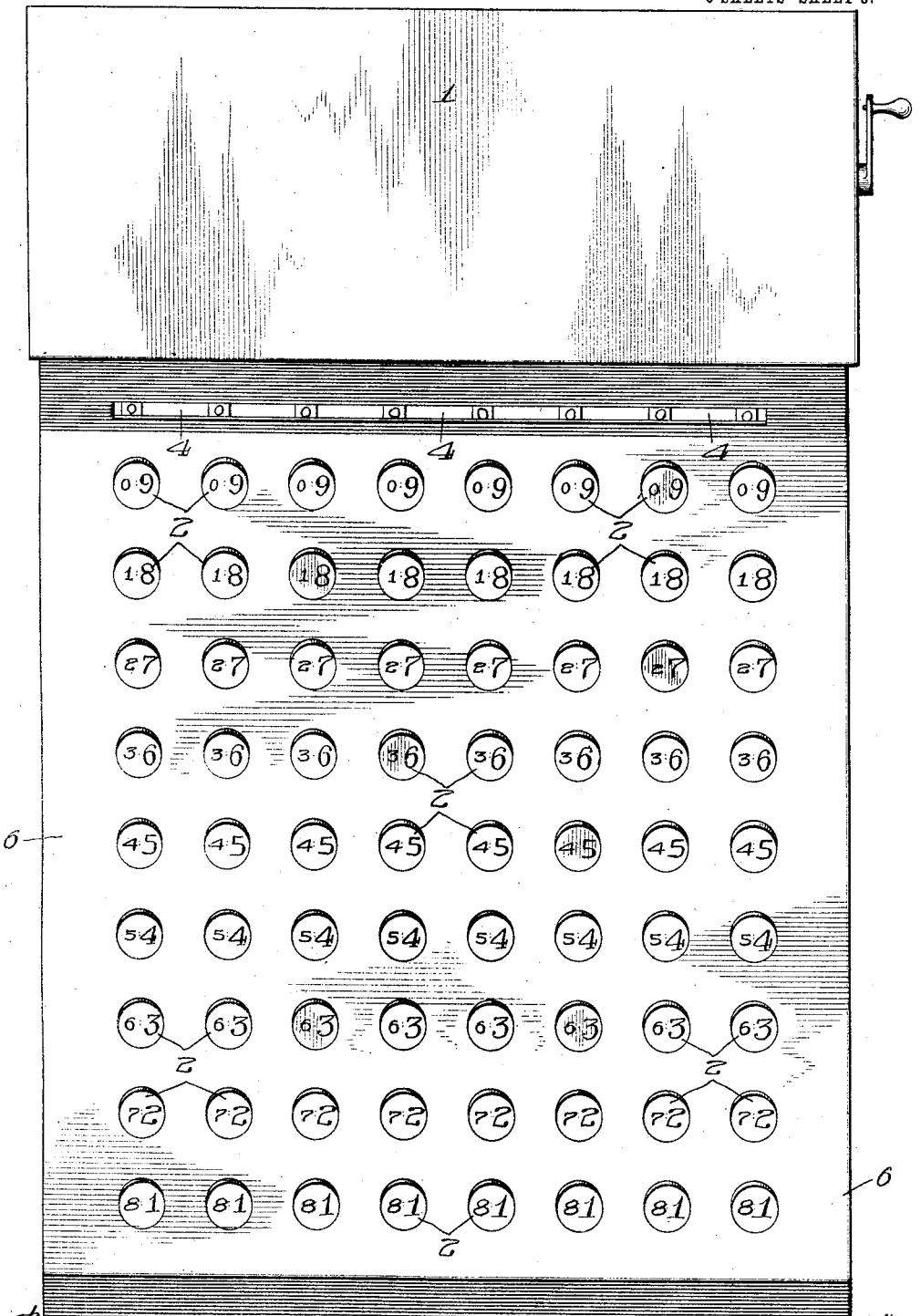
Figure 5:
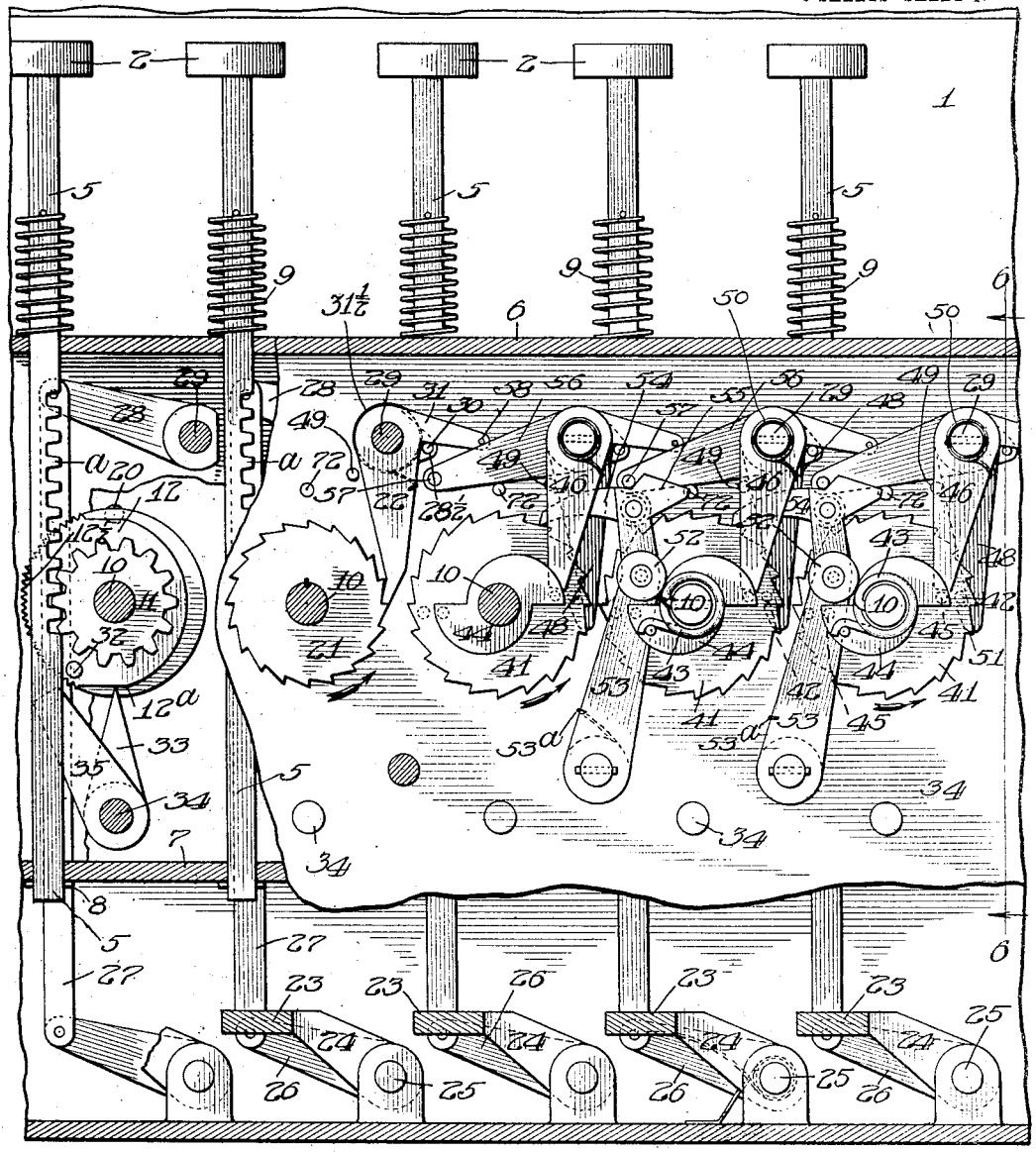

In the accompanying drawings, wherein like or similar reference characters indicate like or corresponding parts, Figure 1 is a partial longitudinal section taken substantially on line 1 1 of Fig. 2. Fig. 2 is a partial transverse section taken substantially on line 2 2 of Fig. 1 with part of the indicator-heads removed to more clearly show the construction. Fig. 3 is a partial transverse section taken substantially on line 3 3 of Fig. 1. Fig. 4 is a plan view of my invention. Fig. 5 is a partial section taken substantially on line 5 5 of Fig. 6 with parts broken away to show the construction. Fig. 6 is a partial section taken substantially on line 6 6 of Fig. 5. Figs. 7 and 8 are details substantially on lines 7 7 and 8 8 of Fig. 6. Fig. 9 is a modification of a certain interlocking mechanism to insure a complete depression of a key. Figs. 10, 11, 12, and 13 are detail views of parts of my device.

In the preferred form of my device shown in the drawings, 1 is the frame or cover of my machine.

2 2 are rows of keys preferably extending longitudinally of the machine, by means of which the same is operated. As shown in Fig. 4, each row is composed of nine keys consecutively numbered from "1" to "9," inclusive, and when desired each may have a complemental number of a different size or color to facilitate the usual operations in subtraction or division. Each row of keys is provided with an oscillating bar 3, provided with a segment 69, having the numerals from "0" to "9," inclusive, successively and regularly arranged upon its periphery, Figs. 1 and 2. A slot or opening 4 is provided in the cover of my device opposite each indicator, through which a number upon the same may be seen, while the other numbers are concealed by the intervening cover, Figs. 1 and 4.

The mechanism of my device is so arranged that with an indicator showing any character at its opening, if any key in the row belonging to that indicator is depressed its full stroke, the indicator will be moved to expose a number equal to the total of the sum of the number previously exposed by the indicator and the number upon the key depressed if the sum-total is less than ten. If the total be ten or more, the units only will be indicated and the next indicator to the left will expose its number plus the tens carried to it from the lower order. These operations are secured in the following manner, and as the mechanism for each row of keys, including the indicators, is substantially identical the following description will refer to the mechanism of one row only, except where otherwise specified. Each key 2 is provided with a suitable stem 5, arranged to slide through suitable openings in the part 6 of the case, forming a guide, also through a second guide-plate 7, secured within the case, Figs. 1, 5, and 6. Each stem is provided with a stop 8 of any desired construction to limit the upward movement of the stem by engaging a fixed part—as, for example, the guide-plate 7—and a spring 9 to normally hold the key in its uppermost position with a stop 8 in contact with the plate 7.

Each row of keys is provided with a shaft 10, Figs. 1, 2, and 5, rotatably mounted in suitable bearings in the case, and with a set of substantially identical engaging means for each key in its row mounted thereon. Thus for each key there is a pinion 11, loosely mounted on the shaft 10, meshing with a cog-rack a on the key-stem 5 and provided with a flange or ratchet-plate 12, formed integral therewith or attached thereto. A drum or equivalent part 14 is loosely mounted on the shaft 10 in proximity to the flange 12 and is resiliently connected therewith by means of a spring 15, having its inner end attached to the drum 14 near its hub or center and its outer end attached, by means of a pin 16, to the flange 12, Figs. 6 and 7. Each drum 14 carries a spring-pawl 17, adapted to engage with a ratchet-wheel 19, pinned or otherwise securely fastened upon the shaft 10. A stop or pin 20 is positioned upon a stationary part near the periphery of the ratchet-wheel 19, so that in the rotation of the parts the pawl 17 will be brought to a stop, thereby simultaneously locking the ratchet against further rotation, thus limiting the movement of the drum 14. On the reverse movement of the key the pinion 11 and drum 14, with the pawl 17, are carried back to their normal positions, when the operations may be repeated. It will be understood that by the use of the term "drum" for the part 14 in the description and claims I do not wish to be understood as limiting myself to the exact form shown. Any suitable member performing the functions of the part 14 will be included by the term. The location of the several pins is governed by the relative numerals on the several keys. For example, for the key carrying the numeral "1" the movement of the drum 14 would be very limited, preferably only sufficient to rotate the ratchet-wheel 19 the distance from one tooth to the next. For the key bearing the numeral "2" the movement would be correspondingly increased and, as shown, the ratchet-wheel would be moved a distance of two teeth. This proportionate movement is maintained throughout the entire series.

To avoid the possibility of "throwing by" or rotating the shaft too far by depressing a key violently, I provide means to lock the parts in position until the key substantially reaches its limit of downward movement, when the parts are released and the shaft 10 is rotated by the pinion 11, spring-actuated drum 14, and the connected parts, as described. In the preferred construction shown this locking means comprises a ratchet-wheel 21, keyed or otherwise secured to the shaft 10 near one end thereof, and a pawl 22, loosely mounted on a shaft 29 and adapted to engage the same to prevent the rotation of the shaft until they are disengaged. An arm 28 is pinned or otherwise secured to the shaft 29 and is connected by a link or rod 27 to an arm 26, firmly secured to a shaft 25 below the shaft 10, Figs. 1, 3, 5, and 6. The shaft 25 is also provided with two or more arms 24, keyed or otherwise secured thereto and supporting a shelf 23, arranged below and in the path of the row of keys, so that as a key approaches its lower limit of movement it will contact with the shelf 23 and depress the same, thereby rocking the shaft 25 and operating the arm 26, link 27, arm 28, and shaft 29. The pawl 22, as stated, however, is loosely mounted on the shaft 29, and provision must be made to transmit the motion of the shaft to the pawl. This is accomplished by means of a second arm or trip 28½, secured to the shaft 29 and adapted to engage the pawl 22 and disengage the same from the ratchet-wheel 21, Fig. 5. As shown, the pawl is provided with an extension 31 for a purpose hereinafter pointed out, the two practically forming a bell-crank lever, and a pin 30, carried by the trip 28½ loosely contacts with the extension 31 and by its action serves to swing the pawl out of engagement with the ratchet-wheel 21. Gravity alone may be sufficient to normally maintain the pawl in position to engage the ratchet-wheel; but I prefer to supplement this action and insure accuracy of operation by employing a spring 31½ or equivalent means, engaging the pawl or its associated parts for this purpose. When after a key has been fully depressed, as described, the pawl 22 is disengaged from the ratchet-wheel 21, the spring 15, Fig. 7, tensioned by the action as set forth and through the connection with ratchet-wheel 19, rotates the shaft 10 to the point where the pawl 17 contacts with and is brought to rest by the stop 20, Figs. 6 and 8. As soon as the pressure upon the key 2 is removed the spring 9 tends to return the pinion 11 and the various associated parts to their normal positions. To guard against errors, however i,t is desirable to provide means to so lock the parts that when one key is partly depressed no other key in the same row can be operated until the depressed key reaches its limit of movement. For the same reason it is desirable that if a key is partly depressed it will not only lock all the other keys, so that they cannot be operated, but also it will itself be locked against returning to its normal position until it has fully completed its downward movement or stroke; when it will be automatically returned to its normal position, as described. In my preferred construction to accomplish this result I provide each flange or ratchet-plate 12 with one or more pins 32, projecting from its face, Fig. 5, and also form suitable ratchet-teeth 12½ on a part or parts of its periphery, while other parts, as at 12ª, are cut away or equivalently formed for a purpose hereinafter set forth. A plurality of pawls 33, corresponding in number with the flanges, are mounted upon and secured to a shaft 34, each pawl being provided with a stop 35, extended in the path of the pins 32. The pawls and stops are formed integral with each other or are so secured together that they form bell-crank levers, so that the operation of any pawl on the shaft will serve to move all the stops, except the single one controlling the particular flange operated, into position in the path of the pins 32 on the several flanges, so that they cannot be operated until released.

Referring to Fig. 5, it will be seen that as the flange 12 is rotated the initial movement will cause the lower pin 32 to move out of the path of the stop 35 controlling that flange. Continuing its rotation, the next operation results in oscillating the pawl 33 and its shaft and the several stops, bringing the latter into operative position and engaging the particular pawl for the flange rotated with the ratchet-teeth 12½, thus securely locking the flange against a reverse movement until the parts are disengaged. This will not be accomplished until the rotation of the flange brings the next cut-away part 12ª in line with the end of the pawl, permitting it, together with its connecting parts, to swing back to their normal positions. The movements are so timed, however, that this only occurs when the key controlling the flange has reached its lower limit of travel. Obviously until that moment the key cannot be retracted, and all other keys in the same row are locked against operation. In the preferred form shown the flange is adapted to make a half-revolution upon each depression of the key, and two parts 12ª are employed. When the flange is making its reverse rotation, the ratchet-teeth engaging with the pawl prevent a key being again depressed until it has fully reached its normal position and all the associated parts have had time to again resume their normal positions. Obviously the parts may be constructed to give the flange a complete revolution, if desired, in which case only a single cut-away part 12ª is necessary.

In the modification shown in Fig. 9 the same object is attained by a bar moving in a direct line instead of a rotary part. As shown the stem 5 of the key is utilized for this purpose and is provided with two indentations 5ª and ratchet-teeth 5ᵇ between them. A pin 32ª on each key-stem is suitably positioned to engage the stop 35ª when the latter is swung forward by the operation of the pawl 33ª on any other stem 5. The operation is obviously substantially equivalent to that described and requires no further mention.

Each shaft 34 is also provided with a disk 36, preferably fixed upon its inner extremity, as shown in Fig. 1, and provided with a pin 37, projecting from its face on each side of its center, Fig. 3. A yoke 38, provided with a slot or track 39, is mounted upon the pins, which are normally positioned in the ends of the slots, as shown. The lower end of the yoke preferably terminates in a stem which is connected to a fixed part of the frame by a spring 40. Any rotation of the shaft, therefore, is opposed by the action of the spring, which upon release of the parts promptly returns the shaft and the parts carried thereby to their normal positions.

It has heretofore been pointed out that at each operation of a key the shaft 10 of that row of keys is rotated a relative distance corresponding to the particular numeral of the key depressed. For convenience the ratchet-wheel 19 is provided with twenty teeth, and in operation it is rotated at each operation of any key of the particular row of keys coöperating therewith the distance measured by as many ratchet-teeth as there are units in the numeral upon the key operated. Thus when the numerals upon the several keys operated in a single row shall equal ten, the shaft 10 will be given a half-rotation, and one unit should be carried to the next higher order. To do this, the shaft 10 for that order or row of keys should be rotated a distance measured by one space or ratchet on the wheel 19 on the shaft. This may be accomplished in any desired manner. In the preferred construction (shown in Figs. 5 and 6) a ratchet-wheel 41, similar to the ratchet-wheels 19, is pinned or otherwise secured upon the lower or outer end of each shaft 10 and is provided with a pin 42 upon its face or with equivalent means for each ten teeth on its periphery. Loosely mounted upon the shaft 10 in proximity to the ratchet-wheel 41 and resiliently connected thereto by a spring 43 is a member provided with a cam, lobe, or wing 44 for each ten teeth upon the ratchet-wheel 41, each lobe or cam being provided with a projecting pin 45 or equivalent means arranged to engage a swinging stop 46 to prevent the cam member from rotating in unison with the ratchet-wheel. The stop 46 is loosely mounted upon the shaft 29 and is operatively connected to a controlling-arm 48, which is normally held against a stop or pin 49 by a suitable spring 50. It is also provided with a part or projection 51, arranged to be engaged with the pins 42 on the ratchet-wheel 41 as the latter is rotated, oscillating the arm and moving the stop 46 out of engagement with the cam member 44, releasing the latter from restraint and permitting it to rotate the predetermined distance necessary for it to perform its function, when it is again brought to rest, as before.

An oscillating lever 53 is provided with a roller 52, held in contact with the cam 44 by a suitable spring 53ª operating on the lever, and at its free end with a cam 55 and a pawl 54, arranged to engage the teeth on the ratchet-wheel 41 of the next higher order. It will thus be seen that at the next rotation of the cam 44, marking a total of ten units in that order, the ratchet-wheel 41 of the higher order is automatically advanced to show the addition of one unit to that order or "carrying the tens" necessary in adding. It will be recalled, however, that the rotation of the shaft 10 is prevented by the engagement of the pawl 22 with the ratchet-wheel 21 on each shaft. Hence the carrying operation cannot be effected until the pawl 22 is disengaged.

To effect this result, I mount an arm 56 on the shaft 29 with its free end extended beneath a pin 58 on the arm 31, forming a part of the pawl 22, and its extremity engaging the cam 55 on the lever 53. Thus as the lever is oscillated, the initial movement releases the pawl 22 from the ratchet-wheel 21, leaving the shaft to be rotated by the advance of the ratchet-wheel 41 in the carrying operation. For this purpose it is advisable to leave sufficient play between the end of the pawl 54 and the shoulder of the teeth in the ratchet-wheel 41, when they are in their normal positions. (Shown in Fig. 5.) The several parts are so timed in their operations that the pawl 22 is simply released from the tooth on the ratchet-wheel it was engaged with and immediately engages the next succeeding tooth, thereby preventing any inaccuracy by the parts being "thrown by" or rotated too far by the momentum of the parts. A stop 72 may also be provided in the path of the pawl 54, which brings the pawls to a positive stop and prevents the parts throwing by.

Having explained the operation of the keys and their coöperating parts, it remains to explain the transmission of their operation to suitable indicators. This may be accomplished in any preferred manner. As shown in the drawings, Fig. 1, each shaft 10 is provided with a beveled pinion 59, meshing with a corresponding gear 60, loosely mounted upon a transverse shaft 62. Each gear 60 is provided with a suitable gear-wheel rotating therewith for a purpose pointed out. In the preferred construction a spur-gear 61 is formed upon the periphery of the beveled gear 60. A spur-pinion 63, loosely mounted upon a second transverse shaft 64, meshes with the gear 61 and carries a ratchet-wheel 56 rigidly attached to its side. The oscillating bars 3, loosely mounted upon the shaft 64 in proximity to their coöperating ratchet-wheel 65, are provided with an extension 66, the two forming a bell-crank lever. The indicator-segment 69 are mounted upon the end of the bars in such a manner as to display the numerals thereon through the sight-apertures 4 in the case. The extensions 66 are each provided with a dog or pawl 68, pivotally secured thereto between its ends, forming a bell-crank lever, one end of which engages the teeth of the ratchet-wheel 65, so that as the latter is rotated the indicators 69 will be operated. When the indicator has reached its upper limit of movement, the other extremity 71 of the dog or pawl 68 contacts with a trip 70, disengaging the dog from the ratchet-wheel 65 and permitting the indicators to return to their normal positions with the dog in position to engage the next tooth on the ratchet-wheel.

Any preferred means may be employed to prevent the accidental displacement of the several parts on the reverse movement of the keys and associated parts. As shown, this function is performed by pawls 73 74, Fig. 1, engaging the teeth of the gear 61. The two parts are so set that one is slightly in advance of the other in operation. Thus when one is seated the other rests on the top of a tooth. This arrangement insures accuracy of operation, one of the pawls always operating on a half-tooth advance.

In the preferred construction the proportional parts of the means directly actuating the indicators are as follows: The bevel-pinion 59 is provided with twelve teeth; the coöperating gear 60, seventy-two teeth; the spur-gear 61, sixty teeth; the spur-pinion 63, twenty teeth, and the ratchet-wheel 65 four teeth. Obviously these parts may be modified as desired so long as they are suitably timed to perform the several functions necessary to the operation of the device.

Any preferred means for resetting the parts after operation may be employed. Such means, forming no part of this invention, is omitted. Obviously this object may be accomplished when desired by simply setting up the complemental member necessary to bring the several indicators to zero.

Having thus described my improvement, it is obvious various immaterial modifications may be made without departing from the spirit of my invention. Hence I do not wish to limit myself to the exact form and construction shown.

What I claim as new, and desire to secure by Letters Patent, is—

1. In a device of the kind described, a plurality of movable keys each provided with a cog-rack, in combination with a pinion for each key meshing with the cog-rack, a ratchet-plate carried by each pinion and a pawl for each plate operative in either direction, maintained in the path of the ratchet-plate out of engagement therewith at either limit of movement of the key but engaging therewith at intermediate points.

2. In a device of the kind described, one or more rows of movable keys, computing and indicating mechanism, and intermediate connections between the keys and said mechanism, in combination with locking means comprising a rockable ratchet-plate for each key operated thereby and moving synchronously therewith, and a pawl maintained in the path of the ratchet-plate out of engagement therewith at either limit of movement of the key but engaging therewith at intermediate points.

3. In a device of the kind described, a rotatable shaft, a plurality of movable keys each provided with means operatively engaging a member loosely mounted upon said shaft, and resilient driving mechanism between said members and the shaft, in combination with a ratchet-plate for each member and operated thereby, a pawl for each plate maintained in the path of the ratchet-plate out of engagement therewith at either limit of movement of the coöperating key but engaging therewith at intermediate points.

4. In a device of the kind described, a shaft, computing and indicating mechanism, intermediate mechanism connecting the shaft with the computing and indicating mechanism, a plurality of movable keys and means for transmitting the movement of the several keys to rotate the shaft varying distances depending upon the particular key operated, in combination with locking mechanism for each key comprising a rockable ratchet-plate for each key, moving synchronously therewith, and a pawl maintained in the path of the ratchet-plate out of engagement therewith at either limit of movement of the coöperating key but engaging therewith at intermediate points.

5. In a device of the kind described, a plurality of rotatable shafts, a row of movable keys for each shaft, an engaging member for each key loosely mounted on a shaft, and resilient driving mechanism between each of said members and the shaft, in combination with a rockable ratchet-plate for each member and operated thereby, a pawl for each plate maintained in the path of the ratchet-plate out of engagement therewith at either limit of movement of the coöperating key but engaging therewith at intermediate points.

6. In a device of the kind described, a row of movable keys, a shaft, indicating means, intermediate mechanism connecting the shaft and indicating means, and means for resiliently transmitting the movement of the several keys to rotate the shaft varying distances depending upon the particular key operated, in combination with locking mechanism for the several keys inoperative upon the keys at either limit of their movement but controlling the movement of a moved key as well as all others in the row at all intermediate points in its movement, whereby upon moving a key in either direction it is locked against retraction and when moved in its operative direction all other keys in the row are locked against movement until the operated key reaches its limit of movement.

7. In a device of the kind described, a shaft, a rotating member loosely mounted thereon, and resilient connecting mechanism arranged to transmit the movement of said member to rotate the shaft in one direction only, in combination with a movable key engaging the rotating member and by its movement operating the latter.

8. In a device of the kind described, a shaft, a plurality of rotating members loosely mounted thereon, and resilient connecting mechanism arranged to transmit the movement of any of said members to rotate the shaft in one direction only, in combination with movable keys engaging the several rotating members and by their movement operating the latter, and locking mechanism coöperating with the rotating members and so arranged that when the member is rotated in either direction it will be locked against reverse movement until the key reaches its limit of movement.

9. In a device of the kind described, a shaft, a plurality of rotating members loosely mounted thereon, connecting mechanism arranged to transmit the movement of each of said members to the shaft, and stop mechanism for each member arranged to limit the rotation of the shaft and to vary the rotation according to the particular member operated, in combination with a movable key for each rotating member engaged therewith and by its movement adapted to rotate the same.

10. In a device of the kind described, a shaft, a plurality of rotating members loosely mounted thereon, resilient connecting mechanism arranged to transmit the movement of each of said rotating members to the shaft, and stop mechanism for each member arranged to limit the rotation of the shaft and to vary the rotation according to the particular member operated, in combination with a movable key for each rotating member engaged therewith, and by its movement adapted to rotate the latter.

11. In a device of the kind described, a shaft, a rotating member loosely mounted thereon, and connecting mechanism arranged to transmit the movement of said member to rotate the shaft in one direction only, in combination with a movable key engaging the rotating member and by its movement operating the same, a pawl and ratchet, and a stop arranged in the path of said pawl arranged to simultaneously arrest the movement of the pawl and lock the ratchet.

12. In a device of the kind described, a shaft, a rotating member loosely mounted thereon, and resilient connecting mechanism arranged to transmit the movement of said member to rotate the shaft in one direction only, in combination with a movable key engaging the rotating member and by its movement operating the latter, a pawl and ratchet, and a stop arranged in the path of said pawl arranged to simultaneously arrest the movement of the pawl and lock the ratchet.

13. In a device of the kind described, a shaft, a plurality of pinions loosely mounted thereon, resilient connecting mechanism arranged to transmit the movement of said pinions to rotate the shaft in one direction only, a pawl and ratchet for each pinion, and a stop arranged in the path of each pawl to simultaneously arrest the movement of the latter and lock the ratchet, said stops being arranged at varying points in the travel of the parts dependent upon the pinion coöperating therewith whereby the rotation of the shaft is varied, in combination with a movable key for each pinion provided with a cog-rack engaging therewith.

14. In a device of the kind described, a shaft, a plurality of rotatable members loosely mounted thereon, connecting mechanism arranged to transmit the movement of each of said members to the shaft, a ratchet for each member adapted to control the rotation of the shaft, a pawl coöperating with the ratchet and concentrically rotatable therewith, and a stop arranged in the path of the pawl and adapted to simultaneously arrest the movement of the same and lock the ratchet, in combination with movable keys engaging the several rotating members, and by their movement operating the latter, and locking mechanism coöperating with the rotating members, and so arranged that when a member is rotated in either direction it will be locked against reverse movement until the key reaches its limit of movement.

15. In a device of the kind described, a shaft, a plurality of rotating members loosely mounted thereon, connecting mechanism arranged to transmit the movement of each of said members to the shaft, a ratchet for each member adapted to control the rotation of the shaft, a pawl coöperating with the ratchet and concentrically rotatable therewith, and a stop arranged in the path of the pawl and adapted to simultaneously arrest the movement of the pawl and lock the ratchet, in combination with a plurality of keys engaging the rotating members and by their movement operating the latter, locking mechanism for the several keys inoperative upon the keys at either limit of their movement but controlling the movement of the moving key as well as all others in the row at all intermediate points in its movement, whereby upon moving a key in either direction it is locked against retraction, and when moved in its operative direction all other keys in the row are locked against movement until the operated key reaches its limit of movement.

16. In a device of the kind described, a shaft provided with a plurality of pinions loosely mounted thereon and arranged to rotate the shaft, each pinion carrying therewith a ratchet provided with a broken section, and carrying one or more pins 32, a pawl and stop connected to operate together, loosely mounted upon a shaft in proximity to the first-named shaft, the pawl coöperating with the ratchet and the stop with the stop 32 of the adjacent ratchet members, in combination with a key 5 for each pinion, provided with a cog-rack meshing with said pinion and imparting motion thereto.

17. In a device of the kind described, a shaft provided with a plurality of pinions 11 each carrying a ratchet 12½, a drum 14 arranged in proximity to each pinion loosely mounted on said shaft and resiliently connected with said pinion, a ratchet-wheel 19 fixed upon the shaft in proximity to each drum and operated by a pawl carried by said drum, and a stop 20 for each ratchet 19, the several stops being arranged at different points to vary the rotation of the shaft and in line with the pawls 17, whereby the latter in contacting with the stop, will be arrested in its movement and the ratchet be locked against further rotation, in combination with a movable key for each pinion 11, provided with a cog-rack meshing with said pinion, substantially as described.

18. In a device of the kind described, a plurality of substantially parallel shafts 10, a row of movable keys for each shaft, a plurality of rotatable members loosely mounted on each shaft and adapted to be operated by the movement of the keys, a locking mechanism for the several keys inoperative upon them at either limit of their movement but controlling the movement of a moved key as well as all others in the row at all intermediate points in its movement, in combination with resilient means connecting the rotatable members with the shaft, and means for communicating a complete cycle of movement of one shaft to a corresponding movement to the next shaft to the left.

19. In a device of the kind described, a shaft, a plurality of movable keys, and intermediate mechanism resiliently transmitting the movement of the keys to the shaft, in combination with mechanism locking the shaft against rotation and releasing means operated by the movement of a key.

20. In a device of the kind described, a ratchet-wheel and means for rotating the same, in combination with a bell-crank lever arranged in proximity to the ratchet-wheel, one arm of the lever carrying an indicator-section and the other provided with a pawl coöperating with the ratchet, and a trip arranged in the path of the pawl and adapted to disengage the same from the ratchet.

21. In a device of the kind described, a ratchet-wheel and means for rotating the same, in combination with a bell-crank lever arranged in proximity to the ratchet-wheel, one arm of the lever carrying an indicator-section and the other provided with a bell-crank lever one end of which operates as a pawl coöperating with the ratchet and a trip arranged in the path of the free end of the pawl-lever adapted to disengage the pawl from the ratchet.

22. In a device of the kind described, a plurality of rows of keys, a ratchet-wheel for each row of keys and intermediate mechanism arranged to transmit the movement of the several keys in a row to its ratchet-wheel and to rotate the same a distance dependent upon the particular key operated, in combination with a bell-crank lever arranged in proximity to each ratchet-wheel one arm of the lever carrying an indicator-section and the other provided with a pawl coöperating with the ratchet and a trip arranged in the path of the pawl and adapted to disengage the same from the ratchet.

23. In a device of the kind described, a plurality of movable keys in combination with a shaft provided with mechanism for each key comprising a rotatable member loosely mounted on the shaft and provided with a spring having one end attached thereto and the other end attached to the rotatable member, a pawl 17 carried by the drum, a ratchet 19 fixed upon the shaft, and a stop 20 arranged in the path of the pawl and adapted to simultaneously arrest the movement of the pawl and lock the ratchet, the location of the several stops 20 being regulated to vary the rotation of the shaft in accordance with the character borne by the particular key operated.

24. In a device of the kind described, a plurality of movable keys resiliently maintained in their normal position, in combination with a shaft provided with mechanism for each key comprising a rotatable member loosely mounted on the shaft and actuated by the key, a drum loosely mounted on the shaft in proximity to the rotatable member and provided with a spring having one end attached thereto and the other end attached to the rotatable member, a pawl 17 carried by the drum, a ratchet 19 fixed upon the shaft, and a stop 20 arranged in the path of the pawl and adapted to simultaneously arrest the movement of the pawl and lock the ratchet, the location of the several stops 20 being regulated to vary the rotation of the shaft, and means locking the shaft against reverse rotation on the reverse movement of the parts to assume their normal positions.

25. In a device of the kind described, a plurality of keys resiliently maintained in their normal positions, in combination with a shaft provided with mechanism for each key comprising a rotatable member loosely mounted on the shaft and actuated by the key, a drum loosely mounted on the shaft in proximity to the said member provided with a spring having one end attached to the drum and the other to the rotatable member, a pawl 17 carried by the drum, a ratchet fixed upon the shaft operated by the pawl, a stop 20 arranged in the path of the pawl adapted to arrest the movement of the pawl and lock the ratchet against further advance movement, the location of the several stops being regulated to vary the rotation of the shaft, and locking mechanism for each key, inoperative at either limit of its movement but controlling at intermediate points, whereby upon moving a key in either direction it is locked against retraction until it reaches its limit of movement.

26. In a device of the kind described, a plurality of resiliently-maintained keys 5, each provided with a cog-rack $a$, in combination with a shaft 10 provided with mechanism for each key comprising a pinion 11 loosely mounted on the shaft and provided with a double ratchet $12\frac{1}{2}$ with release parts $12^a$ and a stop 32, and a drum 14 loosely mounted on the shaft in proximity to the pinion and resiliently connected thereto by a spring 15, a pawl 17 carried by the drum, a ratchet-wheel 19 secured to the shaft and actuated by the pawl 17, a stop 20 arranged in the path of the pawl adapted to arrest the movement of the pawl and the ratchet, and a pawl 33, coöperating with the ratchet $12\frac{1}{2}$ and operating an arm 35 to prevent the rotation of the ratchet $12\frac{1}{2}$ and associated parts for all other keys in the same row.

27. In a device of the kind described, a plurality of substantially parallel shafts and a plurality of keys for each shaft, in combination with mechanism for each key on the shafts except the shaft representing the highest order, comprising a rotatable member loosely mounted on the shaft and actuated by the key, a drum loosely mounted on the shaft and resiliently connected to the rotatable member, a pawl 17 carried by the drum, a ratchet 19 fixedly mounted on the shaft, a stop 20 arranged in the path of the pawl and adapted to simultaneously arrest the movement of the pawl and lock the ratchet, the location of the several stops 20 being regulated to vary the rotation of the shaft, and means for advancing the shaft representing a higher numerical order one interval for a predetermined measured rotation of the shaft of the next lower order, whereby the carrying of the tens in computation is effected.

28. In a device of the kind described, a plurality of movable keys each provided with a cog-rack, a rotatable shaft, a pinion for each key meshing with said cog-rack, loosely mounted on said shaft, and resilient driving mechanism between said pinions and the shaft, in combination with a ratchet-plate for each pinion and operated thereby, a pawl for each plate maintained in the path of the ratchet-plate out of engagement therewith at either limit of movement of the coöperating key by engaging therewith at intermediate points.

In testimony whereof I have hereunto signed my name in the presence of two subscribing witnesses.

DANIEL W. SHIEK.

Witnesses:
BURTON W. HILLS,
CHARLES I. COBB.